US010259139B2

United States Patent
Tajima et al.

(10) Patent No.: US 10,259,139 B2
(45) Date of Patent: Apr. 16, 2019

(54) EXTRUSION FORMING APPARATUS AND EXTRUSION FORMING METHOD

(71) Applicant: NGK Insulators, Ltd., Nagoya (JP)

(72) Inventors: Yuichi Tajima, Nagoya (JP); Ryuji Yamaguti, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 646 days.

(21) Appl. No.: 14/851,515

(22) Filed: Sep. 11, 2015

(65) Prior Publication Data

US 2016/0001460 A1    Jan. 7, 2016

Related U.S. Application Data

(63) Continuation of application No. PCT/JP2014/057022, filed on Mar. 11, 2014.

(30) Foreign Application Priority Data

Mar. 19, 2013    (JP) .................................. 2013-055889

(51) Int. Cl.
   *B28B 3/22*    (2006.01)
   *B28B 3/26*    (2006.01)
   (Continued)

(52) U.S. Cl.
   CPC ................ *B28B 3/269* (2013.01); *B28B 3/22* (2013.01); *B28B 3/224* (2013.01);
   (Continued)

(58) Field of Classification Search
   CPC ..... B28B 2003/203; B28B 3/22; B28B 3/224; B28B 3/269; B29C 47/0028; B29C 47/0884; B29C 47/0894; B29C 47/40; B29C 47/686; B29C 47/705
   See application file for complete search history.

(56) References Cited

U.S. PATENT DOCUMENTS 4,178,145 A * 12/1979 Hamamoto ............. B28B 3/269
                                                425/199
4,935,179 A    6/1990 Kato et al.
(Continued)

FOREIGN PATENT DOCUMENTS

JP    63-230304 A1    9/1988
JP    05-024022 A1    2/1993
(Continued)

OTHER PUBLICATIONS

Extended European Search Report (Application No. 14768206.6) dated Mar. 23, 2017.
(Continued)

*Primary Examiner* — Yogendra N Gupta
*Assistant Examiner* — Joseph S Leyson
(74) *Attorney, Agent, or Firm* — Burr & Brown, PLLC

(57) ABSTRACT

An extrusion forming apparatus includes an extruding section, a chamber drum, and a forming section. The extruding section kneads a material including a ceramic raw material and extrudes a kneaded material. The chamber drum has a first space portion having a first extruding direction extending portion through which the kneaded material is allowed to flow in an extruding direction, and a second space portion which has a second extruding direction extending portion extending in the extruding direction and a direction changing portion bending from the extruding direction to a downward direction, to allow the kneaded material to flow in the downward direction changed from the extruding direction. The second space portion has a cross section obtained by isotropically decreasing a cross section of the first space portion perpendicular to a flow-through direction of the kneaded material. The forming section has a die to extrude a ceramic formed body.

14 Claims, 11 Drawing Sheets

(51) Int. Cl.
  *B29C 47/40* (2006.01)
  *B29C 47/00* (2006.01)
  *B29C 47/12* (2006.01)
  *B29C 47/92* (2006.01)
  *B28B 3/20* (2006.01)

(52) U.S. Cl.
  CPC ...... *B29C 47/0004* (2013.01); *B29C 47/0028* (2013.01); *B29C 47/124* (2013.01); *B29C 47/40* (2013.01); *B29C 47/92* (2013.01); *B28B 2003/203* (2013.01); *B29C 2947/92609* (2013.01)

(56) References Cited

U.S. PATENT DOCUMENTS

| | | | |
|---|---|---|---|
| 6,338,867 | B1 | 1/2002 | Lihotzky-Vaupel |
| 8,758,004 | B2 * | 6/2014 | Tajima ................ B29C 47/0076 425/204 |
| 2004/0194427 | A1 | 10/2004 | Ishii et al. |
| 2009/0029128 | A1 | 1/2009 | Gotoh et al. |
| 2010/0244308 | A1 | 9/2010 | Yamazaki |
| 2013/0078326 | A1 | 3/2013 | Tajima et al. |

FOREIGN PATENT DOCUMENTS

| | | |
|---|---|---|
| JP | 07-032335 A1 | 2/1995 |
| JP | 2003-311726 A1 | 11/2003 |
| JP | 2010-105165 A1 | 5/2010 |
| JP | 2010-221637 A1 | 10/2010 |
| JP | 2013-082203 A1 | 5/2013 |
| WO | 2007/004579 A1 | 1/2007 |

OTHER PUBLICATIONS

International Search Report and Written Opinion (Application No. PCT/JP2014/057022) dated May 20, 2014.

* cited by examiner

EXTRUSION FORMING APPARATUS AND EXTRUSION FORMING METHOD

TECHNICAL FIELD

The present invention relates to an extrusion forming apparatus and an extrusion forming method of a ceramic formed body, and more particularly, it relates to an extrusion forming apparatus and an extrusion forming method capable of performing extrusion of a large ceramic formed bodies having large size.

BACKGROUND ART

A ceramic honeycomb structure which is utilized as a catalyst carrier, a filter or the like for exhaust gas purification is prepared through respective steps of extrusion, drying and firing, which is required enlargement for the purpose of the exhaust gas purification of a large car, a construction machine, a ship or the like.

When the extrusion of a large honeycomb formed body is performed in a lateral direction, there has been the problem that the honeycomb formed body is deformed due to its own weight. To solve the problem, the extrusion of the large honeycomb formed body is performed in a downward direction (gravity direction).

In Patent Documents 1 and 2, there are disclosed methods of performing extrusion of ceramic formed bodies in a downward direction. Additionally, in Patent Document 3, there is disclosed an extrusion forming machine in which a plunger type extruder is provided in a two-stage screw type extrusion forming machine. A kneaded material kneaded by the two-stage screw type extrusion machine is extruded in a downward direction by the plunger type extruder. Furthermore, in Patent Document 4, a vertical extruder including a screw is disclosed. In Patent Document 5, there is disclosed a continuous extrusion forming apparatus including a chamber drum having a first space portion extending in an extruding direction and a second space portion extending from a downstream side of the first space portion in a downward direction.

CITATION LIST

Patent Documents

[Patent Document 1] JP-A-63-230304
[Patent Document 2] JP-A-2003-311726
[Patent Document 3] JP-A-07-32335
[Patent Document 4] JP-A-2010-105165
[Patent Document 5] JP-A-2013-082203

SUMMARY OF THE INVENTION

Problem to be Solved by the Invention

In Patent Documents 1 and 2, a raw material is kneaded by using a pugmill to obtain a kneaded material having a predetermined shape (a round pillar shape), and the kneaded material is put into a forming machine to perform extrusion of a honeycomb formed body. There has been the problem that, when the kneaded material of the predetermined shape is intermittently put into the forming machine and several honeycomb formed bodies are extruded from one kneaded material of the predetermined shape, at a connecting joint (switching) portion between one round pillar-shaped kneaded material and another, a surface state of the honeycomb formed body roughens, and a suitable honeycomb formed body may not be obtained.

The forming apparatus of Patent Document 3 has a stop time due to an intermittent operation of a plunger, and has a poor efficiency. Additionally, this forming apparatus has the problem that quality of the formed body (especially, the state at the circumferential portion) is poor in case of re-extrusion after the plunger is stopped. The forming apparatus of Patent Document 4 has a three-stage screw constitution, and there has been the problem that the apparatus constitution is complicated and increases cost.

Therefore, to solve the above problem, there is contrived a continuous extrusion forming apparatus including a chamber drum having a first space portion extending in an extruding direction and a second space portion extending from a downstream side of the first space portion in a downward direction. According to such a continuous extrusion forming apparatus, it is possible to continuously obtain a honeycomb formed body with suitable surface state and no bent and has a good quality (see Patent Document 5).

However, even in a case where this continuous extrusion forming apparatus is used, when a batch is switched to a kneaded material made of a different material, a switch time from the previous batch to a new batch is long, and long time is required until the formed body made of the new batch is obtained. When the batch is switched, surface roughness occurs on a circumferential side of the flow-through path of the kneaded material in the formed body, and the formed body during the switching is not usable as a product. Consequently, there has been the problem that the switch time of the batch is long and hence, the operation efficiency deteriorates.

An object of the present invention is to provide an extrusion forming apparatus and an extrusion forming method which shorten a batch switch time, further reduce waste in material or forming time, and form ceramic formed bodies having suitable quality in continuous extrusion of the ceramic formed bodies of large size.

Means for Solving the Problem

The present inventors have found that the above object can be achieved by providing, in an extrusion forming apparatus, a chamber drum including a first space portion and a second space portion of a specific shape between an extruding section which kneads and extrudes a kneaded material and a forming section which extrudes a ceramic formed body, based on the finding that surface roughness occurring on a circumferential side of a flow-through path during batch switch of the kneaded material is caused by eccentricity of the kneaded material allowed to flow out. According to the present invention, the following extrusion forming apparatus and extrusion forming method are provided.

[1] An extrusion forming apparatus including an extruding section which kneads a material including a ceramic raw material and extrudes a kneaded material from an extruding port; a chamber drum which includes a first space portion having a first extruding direction extending portion connected to the extruding port and extending from the extruding port in an extruding direction, and a first outflow port opened in an end portion of a downstream side of the extruding direction, allowing the kneaded material to flow through the first space portion from the extruding port in the extruding direction and allowing the kneaded material to flow out from the first outflow port, and a second space portion having a second extruding direction extending portion connected to the first outflow port and extending from the first outflow port in the extruding direction, a direction changing portion bending from the extruding direction to a downward direction, and a second outflow port opened in the end portion of the downstream side, allowing the kneaded material to flow through the second space portion while changing a direction of the kneaded material from the extruding direction to the downward direction, and allowing the kneaded material to flow out from the second outflow port in the downward direction, the second space portion having a cross section obtained by isotropically decreasing a cross section of the first space portion perpendicular to a flow-through direction of the kneaded material; and a forming section connected to the second outflow port of the chamber drum, and having a die through which the kneaded material allowed to flow out from the second outflow port of the chamber drum passes inside, thereby a ceramic formed body is extruded.

[2] The extrusion forming apparatus according to the above [1], wherein a value of a ratio of a diameter of a cross section of the second extruding direction extending portion perpendicular to the extruding direction to a diameter of a cross section of the first extruding direction extending portion perpendicular to the extruding direction is from 0.1 to 0.3.

[3] The extrusion forming apparatus according to the above [1] or [2], wherein the second space portion has a downward direction extending portion extending from an end portion of the downstream side of the direction changing portion in the downward direction and reaching the second outflow port, and a central axis parallel to the downward direction of the downward direction extending portion and a central axis parallel to the downward direction of the forming section are positioned on the same straight line.

[4] The extrusion forming apparatus according to any one of the above [1] to [3], wherein a central axis parallel to the extruding direction of the second extruding direction extending portion and a central axis parallel to the extruding direction of the first extruding direction extending portion are positioned on the same straight line.

[5] The extrusion forming apparatus according to any one of the above [1] to [4], wherein the extruding direction from the extruding section is parallel to a horizontal direction, and the downward direction in which the chamber drum allows the kneaded material to flow outside is parallel to a vertical direction.

[6] The extrusion forming apparatus according to any one of the above [1] to [5], wherein the second space portion has a cylindrical portion extending in the extruding direction, a cylindrical portion extending in the downward direction, and an L-shaped bent portion connecting the cylindrical portions to each other.

[7] The extrusion forming apparatus according to any one of the above [1] to [5], wherein the second space portion has a cylindrical portion extending in the extruding direction, a cylindrical portion extending in the downward direction, and a curved cylindrical portion connecting the cylindrical portions to each other.

[8] The extrusion forming apparatus according to any one of the above [1] to [7], wherein the chamber drum further has a discharge portion branching from the second space portion, and the discharge portion has a discharge port which extends through an outer wall of the chamber drum and through which the kneaded material is discharged to the outside of the extrusion forming apparatus.

[9] The extrusion forming apparatus according to the above [8], wherein the discharge portion branches to extend in the same direction as the second extruding direction extending portion.

[10] The extrusion forming apparatus according to the above [8] or [9], which further has a pressure release device provided in the discharge port.

[11] The extrusion forming apparatus according to any one of the above [1] to [10], wherein the first space portion is connected to an upstream side of the extruding direction of the first extruding direction extending portion, and has a taper portion formed into a taper shape whose sectional area decreases from the extruding port of the extruding section toward the downstream side of the extruding direction and whose sectional area at a downstream end is equal to a sectional area of the first extruding direction extending portion.

[12] The extrusion forming apparatus according to the above [11], wherein in the taper portion, an angle θ represented by the following equation (1) is from 5 to 30°:

$$\theta = \tan^{-1}(D1-D2)/2L1 \quad (1),$$

in which D1 is a height of an inlet of the taper portion, D2 is a diameter of an outlet, and L1 is a length in the extruding direction.

[13] The extrusion forming apparatus according to any one of the above [1] to [12], wherein the extruding section includes a drum having a supply port into which the kneaded material including a ceramic forming raw material is allowed to flow, and an extruding port through which the kneaded material is discharged, and a screw which has a rotary shaft and a spiral rotary blade along the rotary shaft in the drum, and conveys the kneaded material in the extruding direction parallel to the rotary shaft while kneading the kneaded material by rotation of the rotary blade.

[14] The extrusion forming apparatus according to the above [13], wherein in the extruding section, the screws are provided biaxially arranged in parallel in the drum.

[15] An extrusion forming method including an extruding step of kneading a kneaded material including a ceramic raw material and extruding the kneaded material from an extruding port; a first flow-through step of allowing the kneaded material extruded from the extruding port to flow, from the extruding port in an extruding direction, through a first extruding direction extending portion connected to the extruding port and extending from the extruding port in the extruding direction and to flow out from a first outflow port opened in an end portion of a downstream side of the extruding direction; a second flow-through step of allowing the kneaded material allowed to flow out from the first outflow port to flow through a second extruding direction extending portion connected to the first outflow port, extending from the first outflow port in the extruding direction and having a cross section obtained by isotropically decreasing a cross section of the first extruding direction extending portion perpendicular to the extruding direction, and a direction changing portion bending from the extruding direction to a downward direction, to change a direction of a flow-through path of the kneaded material in the first flow-through step from the extruding direction to the downward direction in a state where the flow-through path of the kneaded material is isotropically narrowed, and allowing the kneaded material to flow out in the downward direction from a second outflow port opened in the end portion of the downstream side; and a forming step of passing, through a die, the kneaded material allowed to flow out from the second outflow port to extrude a ceramic formed body.

[16] The extrusion forming method according to the above [15], wherein the kneaded material allowed to flow out from the first outflow port is allowed to flow through the second extruding direction extending portion in which a value of a ratio of a diameter of a cross section of the second extruding direction extending portion perpendicular to the extruding direction to a diameter of a cross section of the first extruding direction extending portion perpendicular to the extruding direction is from 0.1 to 0.3.

[17] The extrusion forming method according to the above [15] or [16], wherein in the forming step, a central axis parallel to an extrusion forming direction and a central axis parallel to the downward direction of a kneaded material current allowed to flow through the portions in the downward direction in the second flow-through step are positioned on the same straight line.

[18] The extrusion forming method according to any one of the above [15] to [17], wherein in the second flow-through step, a central axis parallel to the extruding direction in the second flow-through step and a central axis parallel to the extruding direction in the first flow-through step are positioned on the same straight line.

[19] The extrusion forming method according to any one of the above [15] to [18], wherein in the extruding step, the first flow-through step, and the second flow-through step, the kneaded material allowed to flow through the portions in the extruding direction is allowed to flow through the portions in parallel with a horizontal direction, and in the second flow-through step and the forming step, the kneaded material allowed to flow through the portions in the downward direction is allowed to flow through the portions in parallel with a vertical direction.

Effect of the Invention

An extrusion forming apparatus of the present invention includes a chamber drum including a first space portion and a second space portion between an extruding section which kneads a material to extrude a kneaded material and a forming section to extrude a ceramic formed body. According to such a constitution, a batch switch time can be shortened, and the ceramic formed body having a good quality can continuously and efficiently be prepared. In the chamber drum, the kneaded material is allowed to flow out in a downward direction different from an extruding direction of the extruding section, and hence, even in a large ceramic formed body, a defect such as deformation is less likely to occur. The second space portion has a cross section obtained by isotropically decreasing a cross section of the first space portion, and hence, eccentricity of the kneaded material can be inhibited, and the batch switch time can be shortened.

An extrusion forming method of the present invention includes a first flow-through step and a second flow-through step between an extruding step of kneading a kneaded material to extrude the kneaded material and a forming step of extruding a ceramic formed body. Through these first flow-through step and second flow-through step, the batch switch time can be shortened, and the ceramic formed body having the good quality can continuously and efficiently be prepared. In the second flow-through step, the kneaded material is allowed to flow out in the downward direction different from the extruding direction, and hence, even in a large ceramic formed body, a defect such as the deformation is less likely to occur. A flow-through path in the second flow-through step is obtained by isotropically narrowing a flow-through path in the first flow-through step, and hence, the eccentricity of the kneaded material can be inhibited, and the batch switch time can be shortened.

DETAILED DESCRIPTION OF THE INVENTION

Hereinafter, embodiments of the present invention will be described with reference to the drawings. The present invention is not limited to the following embodiments, and changes, modifications and improvements can be added without departing from the scope of the invention.

1. Extrusion Forming Apparatus

Figure 1:
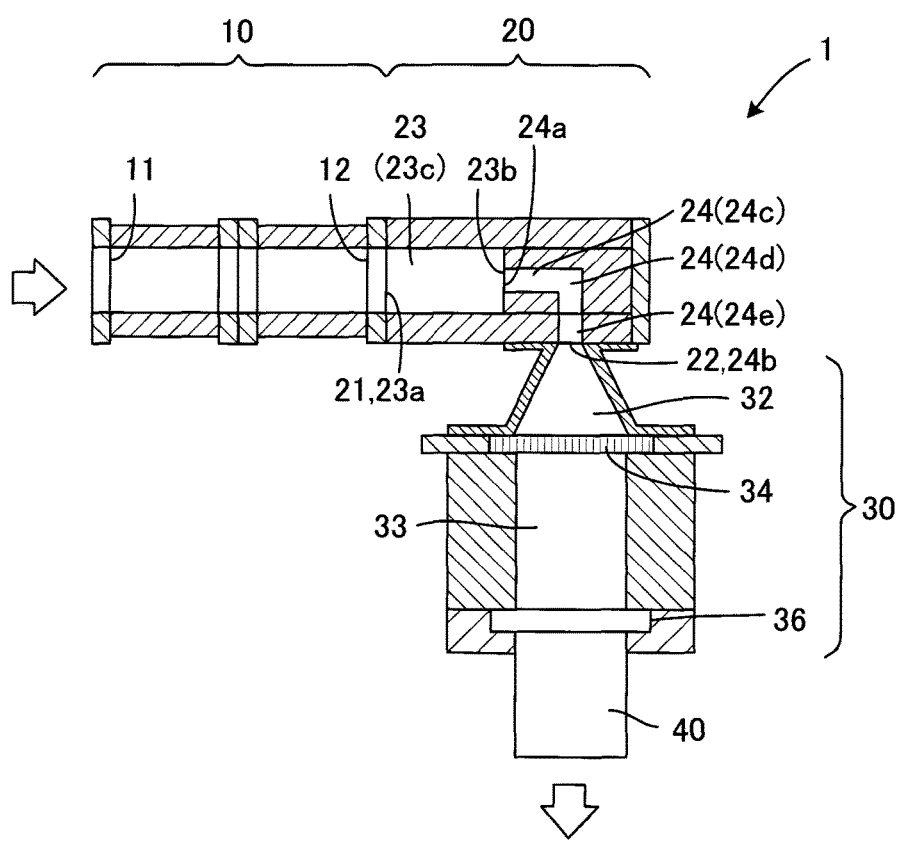
FIG. 1 is a schematic view showing one embodiment of an extrusion forming apparatus of the present invention.

FIG. 1 shows one embodiment of an extrusion forming apparatus of the present invention. The extrusion forming apparatus 1 of the present embodiment includes an extruding section 10, a chamber drum 20, and a forming section 30.

The extruding section 10 kneads a material including a ceramic raw material and supplied from a supply port 11 to extrude a kneaded material from an extruding port 12. In the chamber drum 20, an inflow port 21 thereof is connected to the extruding port 12 of the extruding section 10, and the kneaded material flows through a first space portion 23 and a second space portion 24 in order, to flow out from an outflow port 22.

In the first space portion 23, a first inflow port 23a (inflow port 21) is connected to the extruding port 12 of the extruding section 10, and the first space portion has a first extruding direction extending portion 23c extending from the side of the extruding port 12 of the extruding section 10 in an extruding direction, and a first outflow port 23b opened in an end portion of a downstream side of the extruding direction. The kneaded material flows through the first space portion from the first inflow port 23a in the extruding direction, and flows out from the first outflow port 23b.

In the second space portion 24, a second inflow port 24a is connected to the first outflow port 23b of the first space portion 23, and the second space portion has a second extruding direction extending portion 24c extending from the first outflow port 23b in the extruding direction, a direction changing portion 24d bending from the extruding direction to a downward direction, and a second outflow port 24b opened in the end portion of the downstream side. The kneaded material changes its direction from the extruding direction to flow through the second space portion in the downward direction, and flows out from the second outflow port 24b (outflow port 22) in the downward direction.

The second space portion 24 has a cross section obtained by isotropically decreasing a cross section of the first space portion 23 perpendicular to a flow-through direction of the kneaded material. That is, each of cross sections of a flow-through path formed by the second space portion 24 is a cross section obtained by equally reducing the cross section of the flow-through path of the first space portion 23 in all radial directions on the cross section. In other words, the cross section of the second space portion 24 has a geometrically analogous relation with the cross section of the first space portion 23, and the cross section of the second space portion 24 is smaller. Here, a central axis parallel to the extruding direction of the second extruding direction extending portion 24c and a central axis parallel to the extruding direction of the first extruding direction extending portion 23c are preferably positioned on the same straight line. It is to be noted that when the cross section or the sectional area is simply mentioned in the present description, the cross section perpendicular to the flow-through direction of the kneaded material or the sectional area thereof is meant.

The forming section 30 is connected to the outflow port 22 of the chamber drum 20. Further, the forming section 30 has a die 36 in which the kneaded material allowed to flow out from the outflow port 22 of the chamber drum 20 passes inside, thereby extruding a ceramic formed body. It is to be noted that, hereinafter, a honeycomb formed body 40 will be described as an example of the ceramic formed body, but the ceramic formed body is not limited to the honeycomb formed body 40.

The extruding section 10, the chamber drum 20 and the forming section 30 are continuously connected, and hence, the kneaded material can be kneaded and the honeycomb formed body 40 can continuously be extruded. Therefore, waste in material or forming time can be reduced. In addition, the honeycomb formed body 40 is extruded in the downward direction, and hence even the large honeycomb formed body 40 is less likely to be deformed and also has a suitable quality.

Hereinafter, the extrusion forming apparatus 1 will be described in more detail.

(Chamber Drum)

Figure 2:
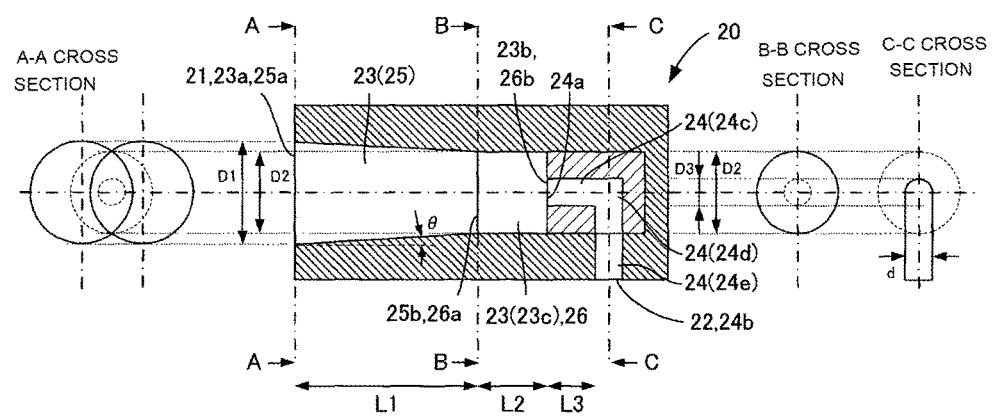
FIG. 2 is a schematic view showing one embodiment of a chamber drum.

FIG. 2 is a schematic view showing one embodiment of the chamber drum 20. As shown in FIG. 2, the chamber drum 20 includes the first space portion 23 and the second space portion 24, and the inflow port 21 and the outflow port 22 are formed.

A value of the ratio (D3/D2, hereinafter also referred to as "narrowing rate") of diameter D3 of the cross section perpendicular to the extruding direction of the second extruding direction extending portion 24c (see FIG. 2) to diameter D2 of an end face of the downstream side of the first extruding direction extending portion 23c (see FIG. 2) is preferably from 0.1 to 0.3, further preferably from 0.15 to 0.3 and especially preferably from 0.15 to 0.25. The above value of the ratio is in such a range, so that eccentricity of the kneaded material and surface roughness due to the eccentricity can be inhibited, and a batch switch time can be shortened. When the above value of the ratio (D3/D2) is smaller than 0.1, the diameter of the second extruding direction extending portion 24c relatively becomes excessively small, and an extruding pressure from the extruding section 10 may excessively enlarges. When the above value of the ratio (D3/D2) is in excess of 0.3, the effect of inhibiting the eccentricity may not sufficiently be obtained. FIG. 2 is a schematic view showing one embodiment of the chamber drum of the present embodiment. It is to be noted that when the first space portion and the second space portion have a sectional shape other than a true circle in the present description, the diameter of the shape is the longest segment that can be drawn in the cross section.

The first space portion 23 has a space extending from the side of the extruding port 12 of the extruding section 10, i.e., the inflow port 21 in the extruding direction to allow the kneaded material to flow through the space in the extruding direction. Further, the first space portion 23 is connected to an upstream side of the extruding direction of the first extruding direction extending portion 23c, and preferably has a taper portion 25 formed into a taper shape whose sectional area decreases from the side of the extruding port 12 of the extruding section 10, i.e., the inflow port 21 toward the downstream side of the extruding direction and whose sectional area at the downstream end is equal to a sectional area of the first extruding direction extending portion 23c. There is not any special restriction on a sectional shape of the first extruding direction extending portion 23c connected to an end portion of the downstream side of the taper portion 25, but from the viewpoint to inhibit accumulation or the eccentricity of the kneaded material, the sectional shape is preferably an ellipse or a true circle, and especially preferably a true circle.

Furthermore, in the taper portion 25, an angle θ represented by the following equation (1) is preferably from 5 to 30°:

$$\theta = \tan^{-1}(D1-D2)/2L1 \qquad (1),$$

in which D1 is a height of the inlet (upstream end 25a) of the taper portion, i.e., the height of the inflow port 21, D2 is a diameter of the outlet (downstream end 25b), and L1 is a length in the extruding direction (distance between the upstream end 25a and the downstream end 25b).

It is to be noted that the height D1 of the inflow port 21 is preferably the same as a diameter of a screw 14 of the extruding section 10.

In a case where, in the extruding section 10, the screws 14 are provided biaxially arranged in parallel (see FIG. 3), an A-A cross section of the chamber drum 20 is preferably formed into such a shape that two circles are overlapped as shown in FIG. 2. The respective circles correspond to the outer shapes and positions of the screws 14 of the extruding section 10. A B-B cross section of the downstream end 25b of the taper portion 25 is preferably a single circle. Further, the shape is smoothly transformed from the A-A cross section to the B-B cross section in a tapered state. In addition, on the downstream side of the B-B cross section (from the upstream end 26a to the downstream end 26b of the cylindrical portion 26), the cylindrical portion 26 is preferably formed with the diameter D2 of the circle in the B-B cross section. It is to be noted that D2 is equal to a length of a portion in which two circles having the diameter D1 intersect each other in the A-A cross section.

When $\theta \geq 5°$ in Equation (1), the chamber drum 20 can be prevented from being lengthened and excessively increased in its volume. In addition, increase of an extruding torque or increase of manufacturing cost of the apparatus can be suppressed. When $\theta \leq 30°$, occurrence of bend of the honeycomb formed body 40 can be prevented. In addition, when $5° \leq \theta \leq 30°$, a pressure state of the flow of the kneaded material by the screws 14 can be a hydrostatic pressure state, and the direction of the flow of the kneaded material can smoothly be changed to the downward direction. In consequence, the honeycomb formed body 40 which does not have any bend can suitably be obtained.

Figure 7:
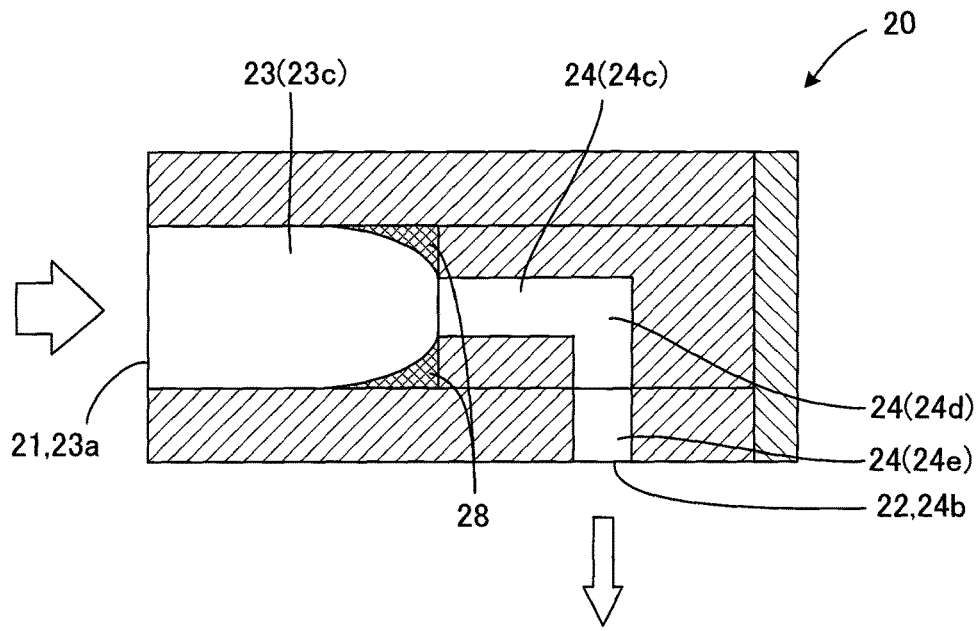
FIG. 7 is a schematic view showing another embodiment of a first space portion.

FIG. 7 shows another embodiment of the chamber drum 20 of the extrusion forming apparatus 1. In the present embodiment, a space portion in which the kneaded material easily accumulates in the first space portion 23 includes an accumulation preventing mold 28 which fills the space portion. It is to be noted that, when the accumulation preventing mold 28 is provided in the first space portion 23, the diameter of the second extruding direction extending portion 24c is a diameter of a cross section of a portion in which the accumulation preventing mold 28 is not present in the cross section perpendicular to the extruding direction.

The accumulation preventing mold 28 shown in FIG. 7 is provided in a portion in which the second inflow port 24a of the second space portion 24 is not opened in an end portion of the downstream side of the first extruding direction extending portion 23c. The kneaded material cannot flow through this portion in the extruding direction, and hence, the kneaded material tends to accumulate. When the accumulation preventing mold 28 is provided, the abovementioned accumulating portion is filled with the accumulation preventing mold 28, and it is possible to inhibit the accumulation of the kneaded material. There is not any special restriction on a material of the accumulation preventing mold 28, but the material can be the same material as to the chamber drum 20. In addition, the accumulation preventing mold 28 may be formed integrally with the chamber drum 20.

There is not any special restriction on a shape of the accumulation preventing mold 28 as long as the accumulation of the kneaded material can be inhibited, but the surface of the accumulation preventing mold which comes in contact with the kneaded material is preferably smoothly curved as shown in FIG. 7. Here, as to the curve, the accumulation preventing mold 28 is preferably curved to be concaved. That is, a taper shape formed by the accumulation preventing mold 28 is preferably more concaved to the outside than a linear taper surface. For example, a shape of the concave can be an elliptic paraboloid, a parabolic secondary curved surface (a parabolic shape) or the like. The accumulation preventing mold 28 is smoothly curved, so that the accumulation of the kneaded material can be inhibited, and simultaneously, the flow-through of the kneaded material can be smooth.

There is not any special restriction on a sectional shape of the second space portion 24, but from the viewpoint to inhibit the accumulation or the eccentricity of the kneaded material, the sectional shape is preferably an ellipse or a true circle, and especially preferably a true circle.

The second space portion 24 preferably has a downward direction extending portion 24e extending from an end portion of the downstream side of the direction changing portion 24d in the downward direction and reaching the second outflow port 24b. Further, a central axis parallel to the downward direction of the downward direction extending portion 24e and a central axis parallel to the downward direction of the forming section 30 are preferably positioned on the same straight line. Furthermore, a central axis parallel to the extruding direction of the second extruding direction extending portion 24c and a central axis parallel to the extruding direction of the first extruding direction extending portion 23c are preferably positioned on the same straight line. According to such a constitution, the accumulation of the kneaded material into the first space portion 23 or the second space portion 24 is decreased, and a flow-through state of the kneaded material is regulated, so that it is possible to inhibit the eccentricity.

It is to be noted that, in the present description, "eccentricity" of the kneaded material indicates that in a distribution state of the kneaded material allowed to flow out, isotropy is impaired and the distribution is deviated in a cross section perpendicular to the outflow direction. For example, as shown in FIG. 12B and FIG. 13B, the center of the distribution of the kneaded material in a cross section perpendicular to the extrusion forming direction of the formed body is not positioned on the central axis parallel to the extrusion forming direction of the formed body, which is in a deviated state. FIG. 12B and FIG. 13B are schematic views showing results of Comparative Example 1 and Comparative Example 2, respectively, and each of the drawings shows a state where the kneaded material is eccentrically distributed.

A degree at which the kneaded material is eccentrically distributed can be represented by using a percentage of distance B between the center of the cross section and the center of the distribution of the kneaded material to radius A of the cross section in the cross section perpendicular to the extrusion forming direction of the formed body (hereinafter also referred to as "an eccentricity amount (E)". $E = B/A \times 100$). The extrusion forming apparatus 1 preferably has a constitution where the eccentricity amount is 5% or less, and further preferably has a constitution where the eccentricity amount is 3% or less.

In the second space portion 24, the second inflow port 24a connected to the first outflow port 23b of the first space portion 23 is positioned closer to the upstream side of the extruding direction than the upstream side end portion of the direction changing portion 24d. A length L3 of the second extruding direction extending portion 24c (see FIG. 2), i.e., a length of the portion extending from the second inflow port 24a of the second space portion 24 in the extruding direction is preferably from 1 to 3 times, and especially preferably twice, as large as the diameter D3 of the second space portion 24.

In the extrusion forming apparatus 1, the extruding direction from the extruding section 10 is parallel to the horizontal direction, and the downward direction in which the chamber drum 20 allows the kneaded material to flow out is parallel to the vertical direction. That is, the extruding direction from the extruding section 10 is preferably orthogonal to the vertical direction. According to such a constitution, the downward direction is the gravity direction, so that even a large honeycomb formed body 40 can suitably be extruded without deformation. In addition, the extruding direction from the extruding section 10 is the horizontal direction, so that broad over and bottom spaces are not required for installation of the extrusion forming apparatus 1.

Figure 4:
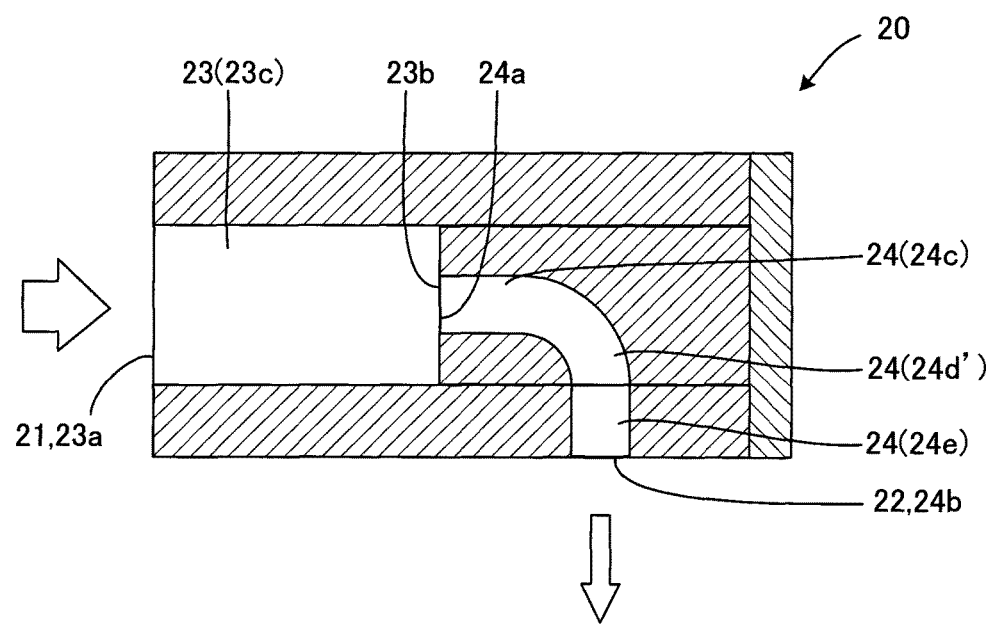
FIG. 4 is a schematic view showing one example of a second space portion.

As shown in FIG. 2, the second space portion 24 preferably has the cylindrical portion (second extruding direction extending portion 24c) extending in the extruding direction, the cylindrical portion (downward direction extending portion 24e) extending in the downward direction, and the L-shaped bent portion 24d connecting the cylindrical portions to each other. Alternatively, as shown in FIG. 4, the second space portion may have the cylindrical portion (second extruding direction extending portion 24c) extending in the extruding direction, the cylindrical portion (downward direction extending portion 24e) extending in the downward direction, and a curved cylindrical portion (direction changing portion 24d') connecting the cylindrical portions to each other. In this case, there is not any special restriction on a curvature radius of the curved shape, but the curvature radius can be, for example, from 20 to 100 mm. FIG. 4 is a schematic view showing one example of the second space portion.

In the second space portion 24, a discharge portion 27 branching from the direction changing portion 24d may be provided. The discharge portion 27 may include a discharge port 27b which extends through an outer wall of the chamber drum 20 and through which the kneaded material is discharged to the outside of the extrusion forming apparatus 1. By such discharge portion 27 being provided, and the kneaded material being discharged in a state where the discharge port 27b is opened, batch switch evaluation of the kneaded material can efficiency be carried out. That is, color, water, hardness, chemical components and the like of the round pillar-shaped kneaded material discharged from the discharge port 27b are inspected, so that it can be confirmed that the kneaded material prior to the switch in the second space portion 24 has completely been replaced with the switched kneaded material. Furthermore, a diameter of the second space portion 24 in the flow-through direction of the kneaded material is smaller as compared with the first space portion 23, the forming section 30 or the like. Therefore, the kneaded material discharged from the discharge port 27b is, for example about ⅓ in cross-section diameter, smaller than the large formed body to be extruded from the die in the forming section 30, so that a batch switch evaluating operation has a suitable efficiency. In addition, even when the kneaded material is branched and discharged from a flow-through route of the kneaded material during the extrusion, the flow-through state of the kneaded material during the extrusion can be inhibited from being disturbed. That is, a diameter of a connecting portion between the second space portion 24 and the discharge portion 27 is small, and hence, an amount of the kneaded material in the second space portion 24 is small, and the flow-through state of the kneaded material during the extrusion can be inhibited from being disturbed. Therefore, even the formed body after the batch switch of the kneaded material is very little influenced by a branch flow passage, and the eccentricity of the formed body is inhibited, so that it is possible to obtain a stable formed body.

Figure 5:
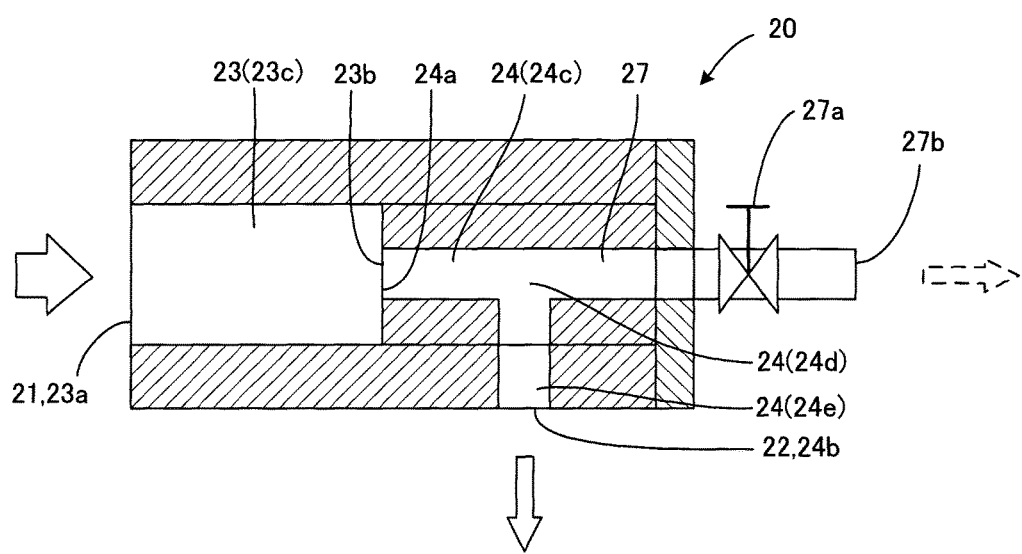
FIG. 5 is a schematic view showing another example of the second space portion.
Figure 6A:
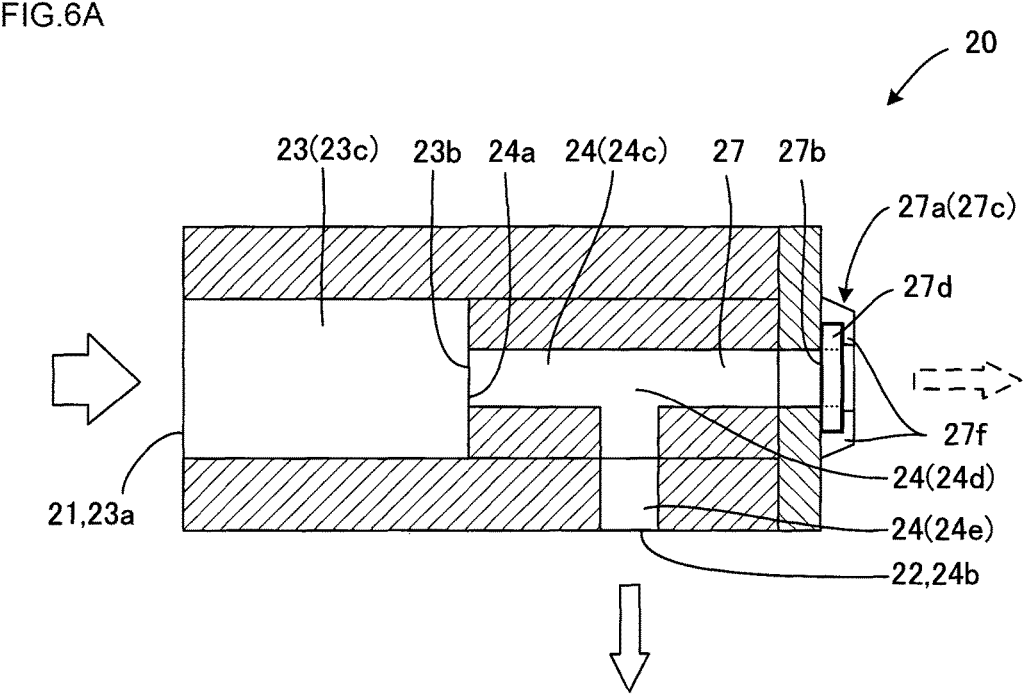
FIG. 6A is a schematic view showing still another example of the second space portion.

The discharge portion 27 preferably has a constitution where the second extruding direction extending portion 24c is extended. That is, the discharge portion 27 preferably branches to extend in the same direction as the second extruding direction extending portion 24c. In particular, as shown in FIG. 5 and FIG. 6A, a central axis of the discharge port 27b and a central axis of the second extruding direction extending portion 24c are preferably positioned on the same straight line. In addition, a diameter of a cross section of the discharge port 27b is preferably equal to a diameter of a cross section of the second extruding direction extending portion 24c. According to the constitution where the discharge portion 27 extends from the second extruding direction extending portion 24c, it is possible to more efficiently switch the batch of the kneaded material. Specifically, the discharge port 27b and the second extruding direction extending portion 24c are positioned on the same straight line and have the equal diameter of the cross section, and hence, the kneaded material flowing through the second extruding direction extending portion 24c in the extruding direction can flow through the discharge port 27b while inhibiting the disturbance of the flow-through state. That is, the influence on the flow-through state of the kneaded material during the extrusion by the branch flow passage is inhibited, so that when the extrusion is restarted after the batch switch of the kneaded material, the eccentricity of the formed body can be inhibited and the stable formed body can be obtained, thereby enabling the switch of the batch in a short time.

In the discharge port 27b, a pressure release device 27a is preferably provided. When the pressure release device 27a is provided in the extrusion forming apparatus 1, a die replacing operation can easily be performed. When a large honeycomb structure having a cross section diameter of, for example, 140 mm or more is manufactured, a pressure of a die portion during the extrusion is as high as 10 MPa or more, and hence, it is necessary to perform the die replacing operation after the pressure in the die is lowered. When such a high pressure is lowered, it is necessary to carefully perform the operation from the viewpoint of safety, and a time of about 1 to 2 hours is required for the die replacing operation. Therefore, it is preferable to install, as lowering means of the die inside pressure, the pressure release device 27a capable of controlling the discharge of the kneaded material from the discharge port 27b to control the pressure in the die. It is to be noted that it is possible to allow the pressure release device 27a to function as a safety valve, when a pressure during forming abnormally rises to a pressure of 20 MPa or more due to forming trouble such as foreign substance contamination.

Figure 6B:
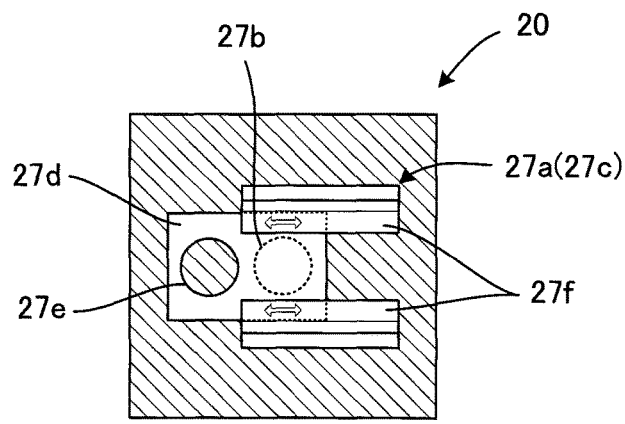
FIG. 6B is a schematic view showing a side surface of the example of FIG. 6A observed from an extruding direction downstream side.

There is not any special restriction on the pressure release device 27a, and a pressure valve or the like can be used. Above all, it is preferable to use a device having a constitution which withstands the high pressure in the second space portion 24 and in which the kneaded material is not caught when the valve is opened and closed. As such pressure release device 27a, for example, such a slide plate gate 27c as shown in FIG. 6A and FIG. 6B is preferable. Furthermore, the device preferably has a constitution where it is possible to momentarily open and close so that the kneaded material is not caught when it is opened and closed. The opening/closing of the slide plate gate 27c can be controlled by, for example, an electromagnetic system, a hydraulic system or the like (not shown).

FIG. 6A is a schematic view showing another example of the second space portion 24, and shows a cross section of the chamber drum 20 including the slide plate gate 27c as the pressure release device 27a at the discharge port 27b, the cross section being parallel to the extruding direction and the vertical direction. FIG. 6B is a schematic view of a side surface of the chamber drum 20 of FIG. 6A which is observed from the downstream side of the extruding direction. The slide plate gate 27c has a constitution where a slide plate 27d is slidable in parallel along rails 27f. In the slide plate 27d, a hole 27e corresponding to the discharge port 27b is provided. The slide plate 27d is moved in parallel to match a position of the discharge port 27b with that of the hole 27e, so that it is possible to discharge the kneaded material from the discharge port 27b.

As an inside structure of the chamber drum 20, a part or all of a structure portion forming the second space portion 24 (hereinafter also referred to as "second space portion structure") may be constituted to be replaceable. That is, the second space portion structure may be a so-called core structure. According to such a constitution, it is possible to easily replace only the second space portion structure. As to the second space portion structure, the diameter of the second space portion 24 is made narrow, and hence, the surface of the second space portion structure on the side of the second space portion 24 more easily wears due to the flow-through of the kneaded material than other structure portion. Additionally, in accordance with a type of kneaded material or the like, the diameter (narrowing rate) of the second space portion 24 or a flow-through path shape (narrowing form) is changed in a certain case. Therefore, when the second space portion structure is of the core structure, the second space portion structure is advantageously replaced.

(Extruding Section)

Figure 3:
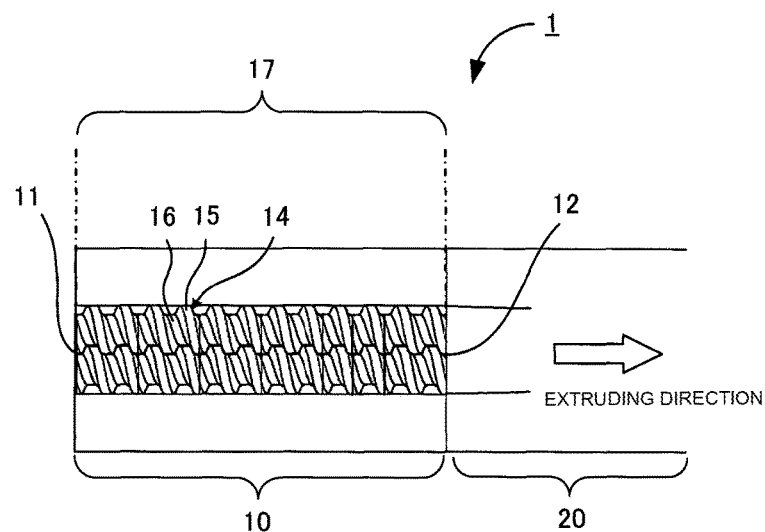
FIG. 3 is a schematic view showing one embodiment of an extruding section.

FIG. 3 shows one embodiment of the extruding section 10. The extruding section 10 includes a drum 17 having the supply port 11 and the extruding port 12, and the screws 14 in the drum 17. The kneaded material including a ceramic forming raw material is allowed to flow into the extruding section 10 from the supply port 11. The screw 14 has a rotary shaft 16 and a spiral rotary blade 15 along the rotary shaft 16, and conveys the kneaded material in the extruding direction parallel to the rotary shaft 16 while kneading the kneaded material by rotation of the rotary blade 15.

In the extruding section 10, the screws 14 are preferably biaxially arranged in parallel in the drum 17. The screws are biaxially arranged in parallel in this manner, so that the kneaded material can be conveyed at a sufficient pressure. However, the extrusion forming apparatus 1 of the present invention is not limited to the screws 14 of the two axes.

There is not any special restriction on the extruding pressure of the extruding section 10, as long as the kneaded material can continuously be extruded and the formed body can be extruded through the forming section 30, but an upper limit value of the extruding pressure is about 20 MPa from a technical limitation of an extrusion apparatus of an industrial production scale.

(Forming Section)

The forming section 30 is connected to the outflow port 22 of the chamber drum 20, and the kneaded material allowed to flow out from the outflow port 22 of the chamber drum 20 is extruded from the inside, thereby forming the honeycomb formed body 40.

The forming section 30 includes a first diameter expanding portion 32 connected to the second space portion 24 and a second diameter expanding portion 33 to extrude the honeycomb formed body 40. The first diameter expanding portion 32 has a taper shape and a diameter of the portion gradually expands. The subsequent second diameter expanding portion 33 substantially has a cylindrical shape whose diameter expands toward the downward direction or a cylindrical shape having a fixed diameter. Between the first diameter expanding portion 32 and the second diameter expanding portion 33, a screen 34 to remove foreign substances is interposed. The screen 34 is interposed to remove coarse grains or the foreign substances in the kneaded material, and, for example, mesh made of SUS304 having openings of about 65 to 420 µm or the like can be suitably used. In addition, the die 36 is provided at a downstream end of the second diameter expanding portion 33.

In the die 36 to prepare the honeycomb formed body 40 for use as a catalyst carrier for exhaust gas purification of a gasoline engine, a slit width of a slit to extrude the honeycomb formed body 40 is preferably from 70 to 170 µm and especially preferably from 70 to 125 µm. In addition, the die 36 communicates with the slit in the die, and diameters of a plurality of kneaded material introducing holes (back holes) defined as the introducing holes of the kneaded material into the die 36 are preferably from 0.08 to 0.20 cm. On the other hand, in the die 36 to prepare the honeycomb formed body 40 for use as a filter (Diesel Particulate Filter, DPF) to remove PM of a diesel engine, a slit width of a slit to extrude the honeycomb formed body 40 is preferably from 100 to 600 and especially preferably from 300 to 450 µm. Additionally, in the die 36, diameters of a plurality of kneaded material introducing holes (back holes) are preferably from 0.1 to 0.3 cm.

Figure 8:
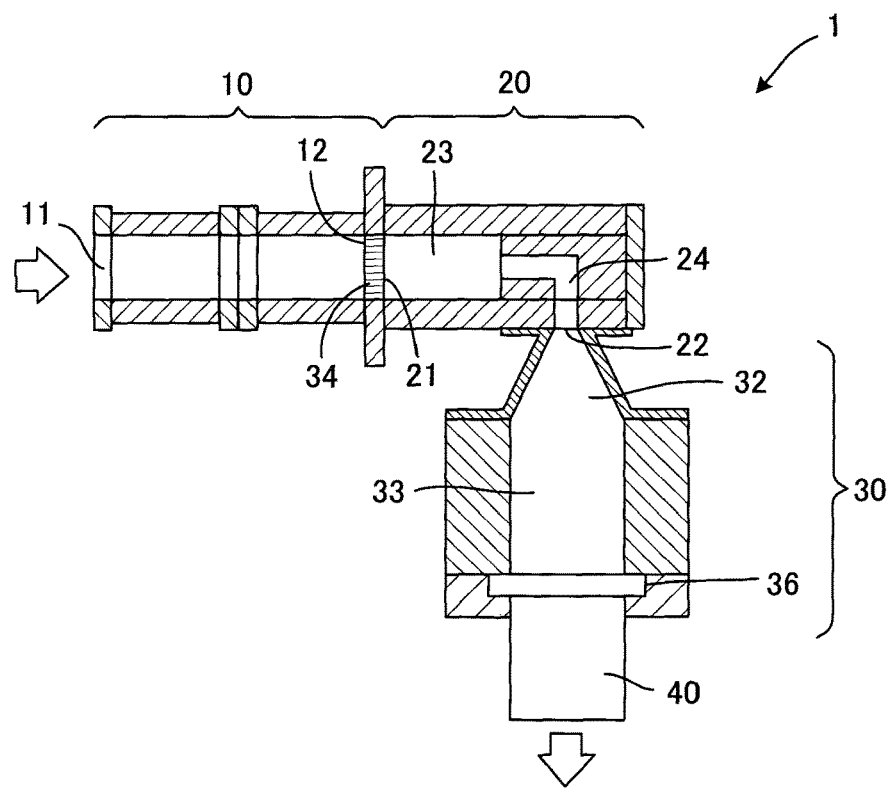
FIG. 8 is a schematic view showing another embodiment of the extrusion forming apparatus.

FIG. 8 shows another embodiment of the extrusion forming apparatus 1. In the present embodiment, between an extruding section 10 and a chamber drum 20, a screen 34 to remove foreign substances is interposed. In the present embodiment, a kneaded material kneaded in the extruding section 10 is extruded from the extruding section 10 to the chamber drum 20. At this time, the kneaded material passes the screen 34, whereby the foreign substances included in the kneaded material are removed. The screen 34 is provided at this position, so that in the present embodiment, the screen 34 is more easily replaced in a certain case depending on the whole layout of the apparatus.

2. Extrusion Forming Method

It is possible to carry out an extrusion forming method of the present invention by use of the abovementioned extrusion forming apparatus 1. Hereinafter, one embodiment of the extrusion forming method of the present invention will be described with reference to the drawings.

The extrusion forming method of the present embodiment is a method including an extruding step, a first flow-through step, a second flow-through step, and a forming step in the order.

The extruding step is a step of kneading the kneaded material including the ceramic raw material to extrude the kneaded material from the extruding port 12. It is possible to carry out the extruding step by use of, for example, the extruding section 10 as shown in FIG. 3.

In the first flow-through step, the kneaded material extruded from the extruding port 12 in the extruding step is allowed to flow through the first extruding direction extending portion 23c in the extruding direction and flow out from the first outflow port 23b. In the second flow-through step, the kneaded material allowed to flow out from the first outflow port 23b in the first flow-through step is allowed to flow through the second extruding direction extending portion 24c having the cross section obtained by isotropically decreasing the cross section of the first extruding direction extending portion 23c perpendicular to the extruding direction and then, the direction changing portion 24d, to change the direction of the flow-through path of the kneaded material in the first flow-through step from the extruding direction to the downward direction in a state where the flow-through path is isotropically narrowed. The direction of the kneaded material is changed to the downward direction, and then, the kneaded material is allowed to flow out from the second outflow port 24b opened in the end portion of the downstream side in the downward direction. That is, in the second flow-through step, the kneaded material is allowed to flow through the second extruding direction extending portion 24c, the direction changing portion 24d, the downward direction extending portion 24e and the like which are the flow-through path narrower than the flow-through path in the first flow-through step. It is possible to carry out the abovementioned first flow-through step and second flow-through step by the chamber drum 20 as shown in FIG. 2 and FIG. 4 to FIG. 7.

Here, the value of the ratio of diameter of the cross section perpendicular to the above extruding direction to diameter of the first extruding direction extending portion (hereinafter also referred to as "narrowing rate") is preferably from 0.1 to 0.3, further preferably from 0.15 to 0.3 and especially preferably from 0.15 to 0.25. The above narrowing rate is in such a range, so that the eccentricity of the kneaded material and the surface roughness due to the eccentricity can be inhibited and the batch switch time can be shortened. When the above narrowing rate (D3/D2) is smaller than 0.1, the diameter of the second extruding direction extending portion 24c relatively becomes excessively small, and the extruding pressure from the extruding section 10 may excessively be enlarged. When the narrowing rate (D3/D2) is in excess of 0.3, the effect of inhibiting the eccentricity may not sufficiently be obtained.

The forming step is a step of passing the kneaded material allowed to flow from the second outflow port 24b in the second flow-through step through the die 36 to extrude the honeycomb formed body 40.

There is not any special restriction on the kneaded material for use in the extrusion forming method of the present embodiment and, for example, a kneaded material including ceramic raw material, water, methylcellulose, additive and the like can be used. As the ceramic raw material, there can be used a cordierite forming raw material, silicon carbide, metal silicon, sialon, mullite, silicon nitride, zirconium phosphate, zirconia, titania, alumina, silica, cordierite, a mixture of them, or the like.

The cordierite forming raw material means a raw material which becomes cordierite by firing. A foamable resin or a water absorbable polymer may further be added to the kneaded material. An example of the foamable resin is an acrylic microcapsule. The foamable resin functions as a pore former. When the water absorbable polymer, together with the ceramic raw material and an organic binder, is mixed with water and kneaded, the polymer absorbs the water to obtain a structure where the water is retained in the polymer, and has characteristics of high mechanical strength and hard to be broken. An example of the water absorbable polymer is a water absorbable resin, and further specifically, an acrylic resin.

Time until the batch of the kneaded material has been switched is preferably 20 minutes or less and further preferably 10 minutes or less, from the viewpoint of operation efficiency.

EXAMPLES

Hereinafter, the present invention will be described in more detail on the basis of examples, but the present invention is not limited to these examples.

Example 1

Extrusion of a honeycomb formed body 40 was performed by using such an extrusion forming apparatus 1 as shown in FIG. 1. First, a kneaded material including a ceramic raw material, water, methylcellulose, an additive and the like was supplied to an extruding section 10, and the honeycomb formed body 40 was extruded from a forming section 30. Next, continuously with the above kneaded material, a colored kneaded material was supplied to the extruding section 10, and the extrusion was performed until a cross section perpendicular to the extrusion forming direction of the honeycomb formed body 40 was entirely colored.

In Example 1, the screw diameter of the extruding section 10 was 50 mm, and the extruding pressure was 13.5 MPa. The second space portion 24 had a cylindrical second extruding direction extending portion 24c, a cylindrical downward direction extending portion 24e, and a direction changing portion 24d connecting the extending portions to each other and bent in an L-shape. The central axis parallel to the extruding direction of the first extruding direction extending portion 23c and the central axis parallel to the extruding direction of the second extruding direction extending portion 24c were in common, and the second space portion 24 had a cross section obtained by isotropically decreasing the cross section of the first space portion 23. The value of a ratio of diameter of the second extruding direction extending portion 24c to diameter of the first extruding direction extending portion 23c (narrowing rate) was 0.17. The slit width of the die 36 was 150 µm, and the diameter of the back hole was 0.14 cm. The size of the honeycomb formed body 40 was 140 mm in diameter.

The results of eccentricity amount (%) and switch time (minutes) of Example 1 are shown in Table 1. The eccentricity amount of the honeycomb formed body 40 was 3%, and the switch time was 10 minutes. The honeycomb formed bodies 40 before the switch of batch and after completion of the switch did not have any bend and were excellent in surface state.

The eccentricity amount (%) was obtained as a percentage of distance B between the center of the cross section and the center of the distribution of the kneaded material to radius A of the cross section perpendicular to the extrusion forming direction of the honeycomb formed body 40 (eccentricity amount E=B/A×100).

For the switch time (minutes), there was measured time (minutes) from the time point where the colored kneaded material first reached the die 36 and was extruded as a part of the honeycomb formed body 40 to the time point where the kneaded material before the switch has been completely replaced with the colored kneaded material after the switch in the honeycomb formed body 40.

Comparative Example 1

Figure 9:
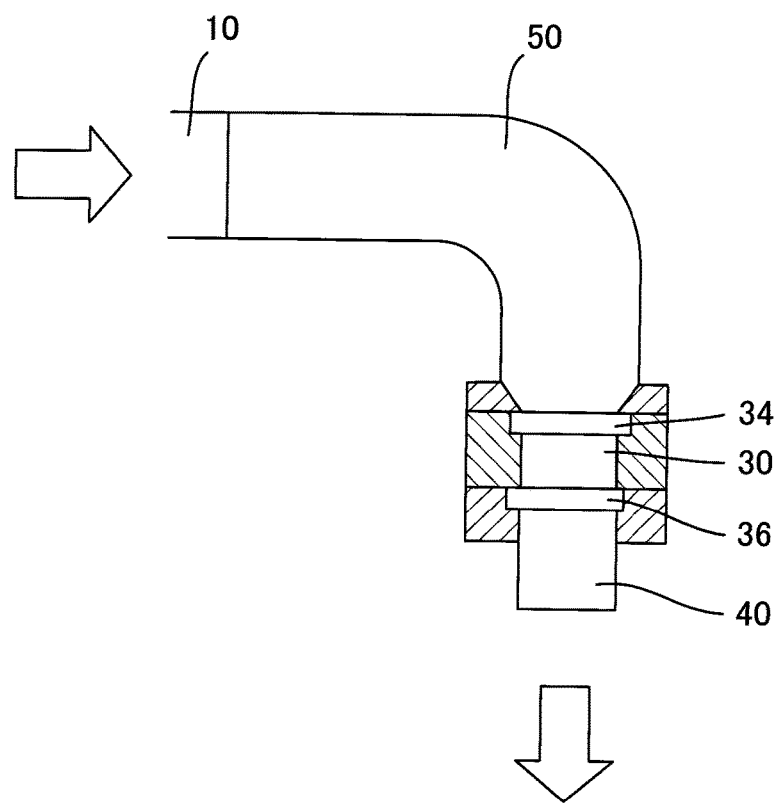
FIG. 9 is a schematic view showing a bent drum in Comparative Example 1.

The procedure of Example 1 was repeated except that there was used an extrusion forming apparatus including such a bent drum as shown in FIG. 9 in place of a chamber drum 20 shown in FIG. 1, to measure an eccentricity amount (%) and the switch time (minutes). The results are shown in Table 1. It is to be noted that bend occurred in the obtained honeycomb formed body.

Comparative Example 2

Figure 10:
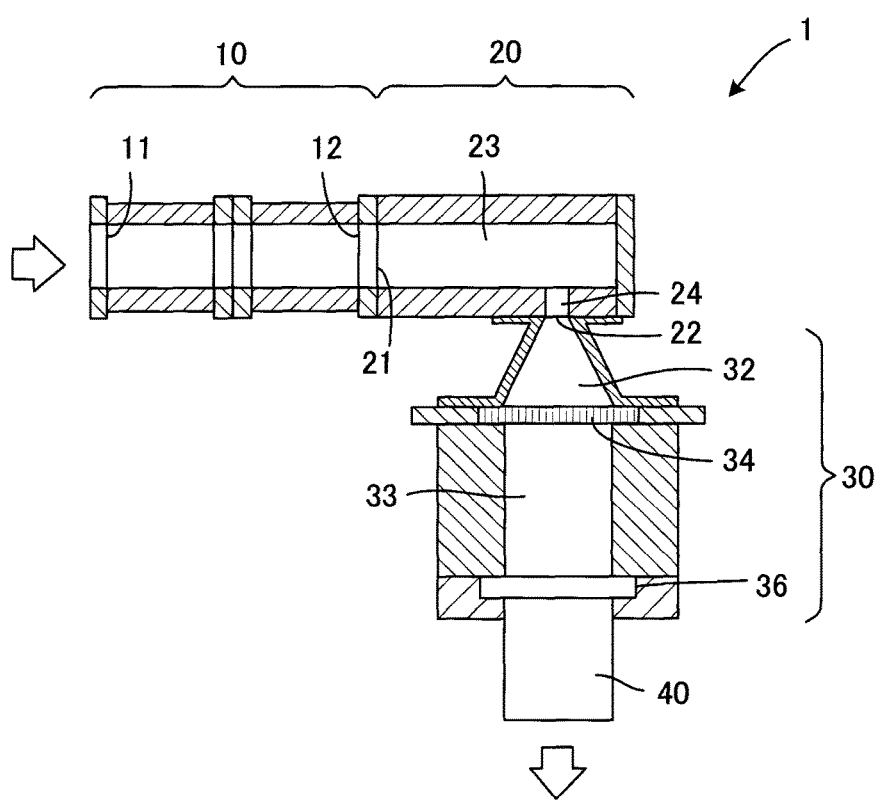
FIG. 10 is a schematic view showing an extrusion forming apparatus of Comparative Example 2.

The procedure of Example 1 was repeated except that an extrusion forming apparatus in which the narrowing form was a simple narrowing as shown in FIG. 10 was used in place of the extrusion forming apparatus 1 shown in FIG. 1, to measure the eccentricity amount (%) and the switch time (minutes). The results are shown in Table 1.

TABLE 1

| | Use application | Main raw material | Die Slit width μm | Die Back hole cm | Die Formed body size mm | Extruding section size screw diameter mm | Extruding Narrowing form | Narrowing rate D3/D2 | Eccentricity amount % | Extruding section extruding pressure MPa | Switch time min. |
|---|---|---|---|---|---|---|---|---|---|---|---|
| Example 1 | Catalyst carrier | Cordierite | 150 | 0.14 | 140 | 50 | L-shape | 0.17 | 3% | 13.5 | 10 |
| Comparative Example 1 | Catalyst carrier | Cordierite | 150 | 0.14 | 140 | 50 | — | 1.00 | 83% | 8.0 | 190 |
| Comparative Example 2 | Catalyst carrier | Cordierite | 150 | 0.14 | 140 | 50 | Simple narrowing | 0.17 | 28% | 12.0 | 110 |

The results of Table 1 indicate that the second space portion 24 narrowed into the L-shape is provided, and hence, it is possible to reduce the eccentricity amount and to shorten the switch time.

In addition, as to Example 1, Comparative Example 1 and Comparative Example 2, situations of flow-through paths were further investigated. That is, as a simulation test, the situations were investigated by extruding a colored kneaded material 62 and an uncolored kneaded material 61 so that the kneaded materials flowed through the first space portion 23 and the second space portion 24 in the chamber drum 20, by use of the apparatus including the chamber drum 20 and diameter expanding portions. Specifically, in the chamber drum 20, a plurality of the colored kneaded materials 62 and the plurality of uncolored kneaded materials 61 were alternately arranged in the extruding direction, were extruded in the extruding direction, and flowed out from the outflow port 22 of the chamber drum 20 to flow into the diameter expanding portions, and a diffused extruded body was prepared. The above apparatus was able to be divided in a plane including the extruding direction and a vertical direction, and hence, by obtaining a cross section of the kneaded material in the apparatus, a flow state of the kneaded material which is visualized by the colored kneaded material 62 can be investigated.

Figure 11A:
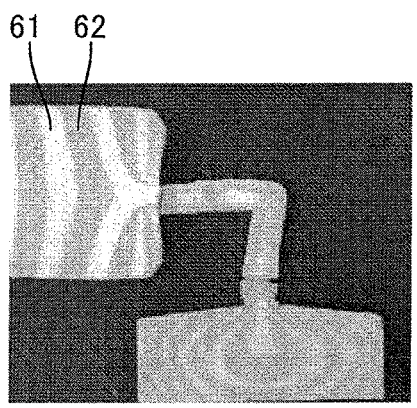
FIG. 11A is a photograph showing a flow-through path cross section of the result of Example 1.
Figure 11B:
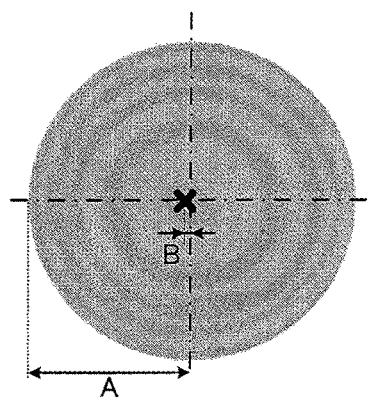
FIG. 11B is a photograph showing a formed body cross section of the result of Example 1.
Figure 12A:
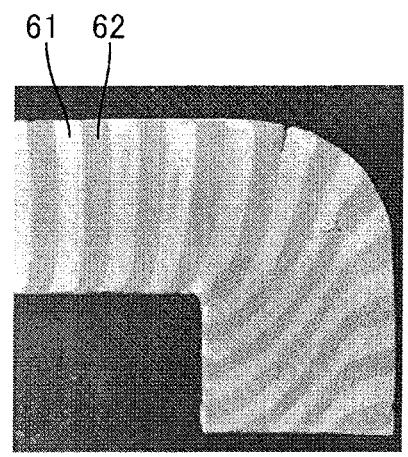
FIG. 12A is a photograph showing a flow-through path cross section of the result of Comparative Example 1.
Figure 12B:
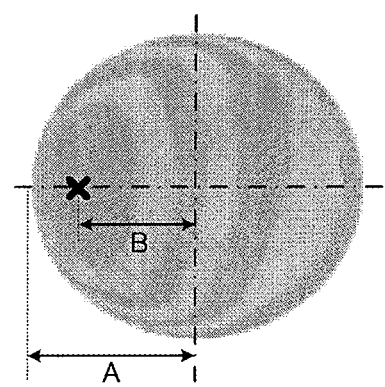
FIG. 12B is a photograph showing a formed body cross section of the result of Comparative Example 1.
Figure 13A:
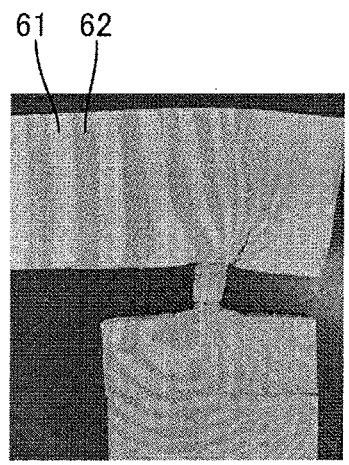
FIG. 13A is a photograph showing a flow-through path cross section of the result of Comparative Example 2.
Figure 13B:
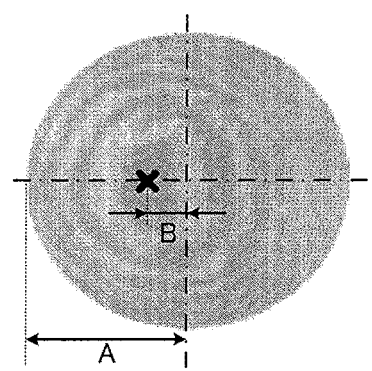
FIG. 13B is a photograph showing a formed body cross section of the result of Comparative Example 2.

FIG. 11A, FIG. 12A and FIG. 13A are photographs in which cross sections of the respective flow-through paths of Example 1, Comparative Example 1 and Comparative Example 2 in the plane including the extruding direction and the vertical direction were photographed by the abovementioned method, respectively. In addition, each of FIG. 11B, FIG. 12B and FIG. 13B is a photograph in which a cross section perpendicular to the extruding direction of the extruded body formed through each of the flow-through paths of Example 1, Comparative Example 1 and Comparative Example 2 was photographed. From these results, in such a bent drum as in Comparative Example 1 (see FIG. 9), symmetry of the kneaded material flowing through the drum was not maintained at the inlet and the outlet of the drum, and in the extruded body, the symmetry noticeably became eccentric. In such a simple narrowing form as in Comparative Example 2 (see FIG. 10), the flow state was disturbed in the vicinity of an inflow port of the second space portion, and as a result, the comparative example has improved as compared with Comparative Example 1, but the eccentricity was still confirmed. On the other hand, in such L-shape narrowing as in Example 1 (see FIG. 1 and FIG. 2), the symmetry of the kneaded material flowing through the second space portion was maintained at the second inflow port 24a and the second outflow port 24b of the second space portion 24, and an extruded body remarkably having little eccentricity was obtained. It is considered that, in Comparative Examples 1 and 2, a difference is made in passing speed between the inside and the outside in the direction changing portion of the flow-through path of the kneaded material, thereby impairing the above symmetry. In Example 1, the diameter of the second space portion 24 was smaller, and hence, it is possible to reduce the inside/outside passing speed difference in the direction changing portion.

Next, the narrowing rate and the shape of the second space portion 24 were investigated.

Examples 2 to 5

The procedure of Example 1 was repeated except that narrowing rates were set to values shown in Table 2 in the extrusion forming apparatus 1 shown in FIG. 1, to measure the eccentricity amounts (%) and the switch times (minutes). The results are shown in Table 2.

Example 6

The procedure of Example 1 was repeated except that there was used an extrusion forming apparatus including a chamber drum 20 having a cylindrical curved portion having a curvature R as shown in FIG. 4 in place of the chamber drum 20 having an L-shaped bent portion 24d shown in FIG. 1 and that the narrowing rate was set to 0.25, to measure the eccentricity amount (%) and the switch time (minutes). The results are shown in Table 2.

Example 7

The procedure of Example 1 was repeated except that there was used an extrusion forming apparatus including a chamber drum 20 having a discharge portion 27 as shown in FIG. 5 in place of the chamber drum 20 having an L-shaped bent portion 24d shown in FIG. 1 and that the narrowing rate was set to 0.25, to measure the eccentricity amount (%) and the switch time (minutes). The results are shown in Table 2.

Example 8

The procedure of Example 1 was repeated except that there was used a chamber drum 20 in which an accumulation preventing mold 28 shown in FIG. 7 was provided, to measure the eccentricity amount (%) and the switch time (minutes). The results are shown in Table 2.

TABLE 2

| | Use application | Main raw material | Die Slit width μm | Die Back hole cm | Die Formed body size mm | Extruding section size screw diameter mm | Extruding Narrowing form | Narrowing rate D3/D2 | Eccentricity amount % | Extruding section extruding pressure MPa | Switch time min. |
|---|---|---|---|---|---|---|---|---|---|---|---|
| Example 3 | Catalyst carrier | Cordierite | 150 | 0.14 | 140 | 50 | L-shape | 0.08 | 0% | 25.0 | 5 |
| Example 1 | Catalyst carrier | Cordierite | 150 | 0.14 | 140 | 50 | L-shape | 0.17 | 3% | 13.5 | 10 |
| Example 2 | Catalyst carrier | Cordierite | 150 | 0.14 | 140 | 50 | L-shape | 0.25 | 3% | 11.5 | 10 |
| Example 4 | Catalyst carrier | Cordierite | 150 | 0.14 | 140 | 50 | L-shape | 0.33 | 11% | 10.5 | 45 |
| Example 5 | Catalyst carrier | Cordierite | 150 | 0.14 | 140 | 50 | L-shape | 0.56 | 22% | 9.0 | 90 |
| Comparative Example 1 | Catalyst carrier | Cordierite | 150 | 0.14 | 140 | 50 | L-shape | 1.00 | 83% | 8.0 | 190 |
| Example 6 | Catalyst carrier | Cordierite | 150 | 0.14 | 140 | 50 | L-shape | 0.25 | 2% | 11.0 | 10 |
| Example 7 | Catalyst carrier | Cordierite | 150 | 0.14 | 140 | 50 | L-shape | 0.25 | 3% | 12.0 | 10 |
| Example 8 | Catalyst carrier | Cordierite | 150 | 0.14 | 140 | 50 | L-shape | 0.25 | 3% | 11.0 | 10 |

The results of Examples 1 to 5 and Comparative Example 1 of Table 2 indicate that, when the second space portion has a cross section obtained by isotropically decreasing the cross section of the first space portion perpendicular to the flow-through direction of the kneaded material, the eccentricity amount and the switch time significantly improve. In particular, it is indicated that, when the narrowing rate is from 0.1 to 0.3, the eccentricity amount and the switch time remarkably improve. In addition, the results of Examples 6 and 7 of Table 2 indicate that, even when the direction changing portion 24d of the second space portion 24 has the cylindrical curved shape or has the discharge portion 27, the eccentricity amount and the switch time remarkably improve. Additionally, the result of Example 8 of Table 2 indicates that, even when the accumulation preventing mold 28 is provided, the eccentricity amount and the switch time remarkably improve.

Further, there were also investigated a case where a scale of the extrusion forming apparatus 1 was expanded and a case where a main raw material or a honeycomb form was changed.

Examples 9 to 13 and Comparative Examples 3 and 4

The procedure of Example 1 was repeated except that a main raw material, a size of the die, an extruding section size, a narrowing form and the like shown in Table 3 were used, to measure the eccentricity amounts (%) and the switch times (minutes). The results are shown in Table 3.

TABLE 3

| | Use application | Main raw material | Die Slit width μm | Die Back hole cm | Die Formed body size mm | Extruding section size screw diameter mm | Extruding Narrowing form | Narrowing rate D3/D2 | Eccentricity amount % | Extruding section extruding pressure MPa | Switch time min. |
|---|---|---|---|---|---|---|---|---|---|---|---|
| Example 9 | Catalyst carrier | Cordierite | 150 | 0.14 | 200 | 70 | L-shape | 0.25 | 3% | 17.0 | 10 |
| Comparative Example 3 | Catalyst carrier | Cordierite | 150 | 0.14 | 200 | 70 | Simple narrowing | 0.17 | 32% | 16.5 | 120 |
| Example 10 | Catalyst carrier | Cordierite | 150 | 0.14 | 360 | 130 | L-shape | 0.25 | 2% | 18.5 | 15 |
| Comparative Example 4 | Catalyst carrier | Cordierite | 150 | 0.14 | 360 | 130 | Simple narrowing | 0.17 | 29% | 18.0 | 100 |
| Example 11 | DPF | Cordierite | 410 | 0.21 | 410 | 130 | L-shape | 0.25 | 3% | 9.5 | 10 |
| Example 12 | Catalyst carrier | Alumina | 210 | 0.18 | 410 | 130 | L-shape | 0.25 | 2% | 17.0 | 15 |
| Example 13 | Catalyst carrier | Zirconia | 130 | 0.13 | 410 | 130 | L-shape | 0.25 | 2% | 15.5 | 12 |

The results of Table 3 indicate that, even when the scale of the extrusion forming apparatus 1 was expanded or even when the main raw material or the honeycomb form matched with each type of use application is changed, the eccentricity amount and the switch time remarkably improve.

Further, there was investigated a die replacing time in a case where the discharge portion 27 and the pressure release device 27a were provided in the extrusion forming apparatus. As a comparison, there was investigated an extrusion forming apparatus (Examples 10 and 11) which did not have the discharge portion 27 and the pressure release device 27a.

Example 14

The procedure of Example 10 was repeated except that there was used a chamber drum 20 in which a discharge portion 27 and a pressure release device 27a (slide plate gate 27c) were arranged as shown in FIG. 6A and FIG. 6B in the extrusion forming apparatus of Example 10, to measure the eccentricity amount (%) and the switch time (minutes). In addition, a die replacing time (minutes) was measured by using the extrusion forming apparatuses of Example 10 and the present Example 14. The results are shown in Table 4.

Example 15

The procedure of Example 11 was repeated except that there was used a chamber drum 20 in which a discharge portion 27 and a pressure release device 27a (slide plate gate 27c) were arranged as shown in FIG. 6A and FIG. 6B in the extrusion forming apparatus of Example 11, to measure the eccentricity amount (%) and the switch time (minutes). In addition, a die replacing time (minutes) was measured by using the extrusion forming apparatuses of Example 11 and the present Example 15. The results are shown in Table 4.

The die replacing time (minutes) is a time from when flow-through of the kneaded material is stopped, pressure release is performed and then, the die is replaced until the flow-through of the kneaded material is enabled again. In each of the extrusion forming apparatuses of Examples 14 and 15, there was measured the die replacing time in a case where the pressure release device 27a was opened to perform the pressure release from the discharge portion 27. On the other hand, as a comparison, for the extrusion forming apparatuses (Examples 10 and 11) which did not have the discharge portion 27 and the pressure release device 27a, there was measured a die replacing time in a case where the pressure release was performed from an extruding outlet from which the honeycomb formed body was extruded, as in a conventional technology.

The results of Table 4 indicate that, in the extrusion forming apparatus in which the discharge portion 27 and the pressure release device 27a are arranged, the die replacing time can noticeably be shortened, in addition to the reduction of the eccentricity amount and the shortening of the batch switch time of the kneaded material.

INDUSTRIAL APPLICABILITY

The extrusion forming apparatus of the present invention can be utilized as an extrusion forming apparatus of a ceramic formed body. In particular, the apparatus is suitable for extrusion of a large honeycomb formed body, specifically a honeycomb structure (formed body) for use as a DPF or a catalyst carrier for exhaust gas purification of a gasoline-fueled car.

DESCRIPTION OF REFERENCE NUMERALS

1: extrusion forming apparatus, 10: extruding section, 11: supply port (of the extruding section), 12: extruding port (of the extruding section), 14: screw, 15: rotary blade, 16: rotary shaft, 17: drum, 20: chamber drum, 21: inflow port (of the chamber drum), 22: outflow port (of the chamber drum), 23: first space portion, 23a: first inflow port, 23b: first outflow port, 23c and 26: first extruding direction extending portion, 24: second space portion, 24a: second inflow port, 24b: second outflow port, 24c: second extruding direction extending portion, 24d and 24d': direction changing portion, 24e: downward direction extending portion, 25: taper portion, 25a: upstream end (of the taper portion), 25b: downstream end (of the taper portion), 26: cylindrical portion, 26a: upstream end (of the first extruding direction extending portion), 26b: downstream end (of the first extruding direction extending portion), 27: discharge portion, 27a: pressure release device, 27b: discharge port, 27c: slide plate gate, 27d: slide plate, 27e: hole, 27f: rail, 28: accumulation preventing mold, 30: forming section, 32: first diameter expanding portion, 33: second diameter expanding portion, 34: screen, 36: die, 40: honeycomb formed body, 50: bent drum, 61: uncolored kneaded material, and 62: colored kneaded material.

The invention claimed is:

1. An extrusion forming apparatus comprising:
an extruding section which kneads a material including a ceramic raw material and extrudes a kneaded material from an extruding port;
a chamber drum which includes:
a first space portion having a first extruding direction extending portion connected to the extruding port and extending from the extruding port in an extruding direction, and a first outflow port opened in an end portion of a downstream side of the first extrud-

TABLE 4

| | Use application | Main raw material | Die | | | Extruding | | Narrowing rate D3/D2 | Pressure release device | Eccentricity amount % | Extruding section extruding pressure MPa | Switch time min. | Die replacing time min. |
|---|---|---|---|---|---|---|---|---|---|---|---|---|---|
| | | | Slit width μm | Back hole cm | Formed body size mm | section size screw diameter mm | Narrowing form | | | | | | |
| Example 10 | Catalyst carrier | Cordierite | 150 | 0.14 | 360 | 130 | L-shape | 0.25 | None | 2% | 18.5 | 15 | 50 |
| Example 11 | DPF | Cordierite | 410 | 0.21 | 410 | 130 | L-shape | 0.25 | None | 3% | 9.5 | 10 | 110 |
| Example 14 | Catalyst carrier | Cordierite | 150 | 0.14 | 360 | 130 | L-shape | 0.25 | Present | 2% | 19.0 | 15 | 10 |
| Example 15 | DPF | Cordierite | 410 | 0.21 | 410 | 130 | L-shape | 0.25 | Present | 3% | 9.5 | 10 | 20 | ing direction extending portion, allowing the kneaded material to flow through the first space portion from the extruding port in the extruding direction and allowing the kneaded material to flow out from the first outflow port, and a second space portion having a second extruding direction extending portion connected to the first outflow port and extending from the first outflow port in the extruding direction, a direction changing portion bending from the extruding direction to a downward direction, and a second outflow port opened in an end portion of a downstream side of the direction changing portion, allowing the kneaded material to flow through the second space portion while changing a direction of the kneaded material from the extruding direction to the downward direction, and allowing the kneaded material to flow out from the second outflow port in the downward direction, the second space portion having a cross section obtained by isotropically decreasing a cross section of the first space portion perpendicular to a flow-through direction of the kneaded material; and a forming section connected to the second outflow port of the chamber drum, and the forming section having a die through which the kneaded material allowed to flow out from the second outflow port of the chamber drum passes inside, thereby a ceramic formed body is extruded.

2. The extrusion forming apparatus according to claim 1, wherein a value of a ratio of a diameter of a cross section of the second extruding direction extending portion perpendicular to the extruding direction to a diameter of a cross section of the first extruding direction extending portion perpendicular to the extruding direction is from 0.1 to 0.3.

3. The extrusion forming apparatus according to claim 1, wherein the second space portion has a downward direction extending portion extending from an end portion of the downstream side of the direction changing portion in the downward direction and reaching the second outflow port, and a central axis parallel to the downward direction of the downward direction extending portion and a central axis parallel to the downward direction of the forming section are positioned on the same straight line.

4. The extrusion forming apparatus according to claim 1, wherein a central axis parallel to the extruding direction of the second extruding direction extending portion and a central axis parallel to the extruding direction of the first extruding direction extending portion are positioned on the same straight line.

5. The extrusion forming apparatus according to claim 1, wherein the extruding direction from the extruding section is parallel to a horizontal direction, and the downward direction in which the chamber drum allows the kneaded material to flow outside is parallel to a vertical direction.

6. The extrusion forming apparatus according to claim 1, wherein the second space portion has a cylindrical portion extending in the extruding direction, a cylindrical portion extending in the downward direction, and an L-shaped bent portion connecting the cylindrical portions to each other.

7. The extrusion forming apparatus according to claim 1, wherein the second space portion has a cylindrical portion extending in the extruding direction, a cylindrical portion extending in the downward direction, and a curved cylindrical portion connecting the cylindrical portions to each other.

8. The extrusion forming apparatus according to claim 1, wherein the chamber drum further has a discharge portion branching from the second space portion, and the discharge portion has a discharge port which extends through an outer wall of the chamber drum and through which the kneaded material is discharged to the outside of the extrusion forming apparatus.

9. The extrusion forming apparatus according to claim 8, wherein the discharge portion branches to extend in the same direction as the second extruding direction extending portion.

10. The extrusion forming apparatus according to claim 8, which further has a pressure release device provided in the discharge port.

11. The extrusion forming apparatus according to claim 1, wherein the first space portion is connected to the extruding port of the extruding section at an upstream side of the extruding direction of the first extruding direction extending portion, and has a taper portion formed into a taper shape whose sectional area decreases from the extruding port of the extruding section toward the downstream side of the first extruding direction extending portion and whose sectional area at a downstream end is equal to a sectional area of the first extruding direction extending portion.

12. The extrusion forming apparatus according to claim 11, wherein in the taper portion, an angle θ represented by the following equation (1) is from 5 to 30°:

$$\theta = \tan^{-1}(D1-D2)/2L1 \qquad (1),$$

in which D1 is a height of an inlet of the taper portion, D2 is a diameter of an outlet, and L1 is a length in the extruding direction.

13. The extrusion forming apparatus according to claim 1, wherein the extruding section includes:

a drum having a supply port into which the kneaded material including a ceramic forming raw material is allowed to flow, and an extruding port through which the kneaded material is discharged, and a screw which has a rotary shaft and a spiral rotary blade along the rotary shaft in the drum, and conveys the kneaded material in the extruding direction parallel to the rotary shaft while kneading the kneaded material by rotation of the rotary blade.

14. The extrusion forming apparatus according to claim 13, wherein in the extruding section, the screws are provided biaxially arranged in parallel in the drum.

* * * * *